United States Patent [19]

Roth et al.

[11] Patent Number: 5,581,529
[45] Date of Patent: Dec. 3, 1996

[54] COMBINATION OF A RECORDING ARRANGEMENT AND A SOURCE SELECTION ARRANGEMENT

[75] Inventors: Rudolf Roth; Reinder Haakma, both of Eindhoven, Netherlands

[73] Assignee: U.S. Philips Corporation, New York, N.Y.

[21] Appl. No.: 345,028

[22] Filed: Nov. 23, 1994

[30] Foreign Application Priority Data

Nov. 24, 1993 [EP] European Pat. Off. .............. 93203284

[51] Int. Cl.$^6$ ................................................... G11B 5/027
[52] U.S. Cl. ................................. 369/84; 369/85; 360/4; 360/61; 360/32
[58] Field of Search ............................... 369/124, 32, 48, 369/85, 84, 60; 360/61, 4, 32, 64

[56] References Cited

U.S. PATENT DOCUMENTS

| | | | |
|---|---|---|---|
| 4,897,739 | 1/1990 | Hasegawa et al. | 360/61 |
| 5,036,409 | 7/1991 | Kaaden et al. | 360/61 |
| 5,296,977 | 3/1994 | Fujioka | 360/61 |
| 5,301,071 | 4/1994 | Takimoto | 360/61 |

*Primary Examiner*—Nabil Hindi
*Attorney, Agent, or Firm*—Richard A. Weiss

[57] ABSTRACT

A combination including a recording arrangement and a source selection arrangement. The recording arrangement includes at least two different inputs for receiving different types of signals (e.g., analog, digital and/or optical); a recording unit for recording a digital signal on the record carrier; and a switching unit for coupling one of the inputs to the recording unit. (If the input coupled to the recording unit does receive a digital signal, then recording arrangement includes a conversion device for converting that signal to digital form.) The source selection arrangement includes at least two different outputs for supplying different types of signals (e.g., analog, digital and/or optical) to corresponding inputs of the recording arrangement; and a source selection unit for selecting between different signal sources and thereby enabling the signal source selected to supply a signal to one of the outputs. The combination further includes a user actuatable input unit for enabling a user to select a source, and a selection signal generator unit for generating a selection control signal which controls the selection operation of the source selection in response to the source selected by the user. The selection signal generator includes a memory which stores information relating to the source selected by the user and indicating to which input of the inputs of the recording arrangement the signal supplied by the signal source selected is supplied, and supplies a switching control signal to the switching unit to control to which input of the inputs of recording arrangement it is coupled.

25 Claims, 3 Drawing Sheets

COMBINATION OF A RECORDING ARRANGEMENT AND A SOURCE SELECTION ARRANGEMENT

BACKGROUND OF THE INVENTION

The invention relates to a combination of a recording arrangement for recording a signal in a digital form on a record carrier and a source selection arrangement for selecting a source to supply a signal to the recording arrangement. The recording arrangement comprises:

a) an analog electrical input for receiving an analog signal, b) a digital electrical input for receiving a digital signal and/or an optical input for receiving an optical signal, c) an analog-to-digital converter for converting an analog signal applied to the analog electrical input into a digital signal, d) a recording unit for recording a digital signal onto the record carrier, the recording unit having an input for receiving the digital signal to be recorded, and e) a first switching unit for coupling the analog electrical input or the digital electrical input (if present) or the optical input (if present) to the input of the recording unit under the influence of a first control signal.

The source selection arrangement comprises:

a) a source selection unit for selecting between a first signal source, a second signal source and at least a third signal source, b) an analog electrical output for supplying an analog signal, and c) a digital electrical output for supplying a digital signal and/or an optical output for supplying an optical signal. The analog electrical output of the source selection arrangement is coupled to the analog electrical input of the recording arrangement, the digital electrical output (if present) of the source selection arrangement is coupled to the digital electrical input (if present) of the recording arrangement, and the optical output (if present) of the source selection arrangement is coupled to the optical input (if present) of the recording arrangement. The combination further comprises a user actuatable input unit coupled to a selection signal generator adapted to generate a selection signal at an output in response to the user actuation of the input unit. The selection signal has a relation to the source being selected by the user by means of actuating the input unit, and the output of the selection signal generator is coupled to the source selection unit.

The invention also relates to a recording arrangement and a source selection arrangement for use in the combination.

The record carrier may be a magnetic record carrier or another type of record carrier, such as an optical record carrier. The signal to be recorded may be a digital audio signal, or a digital video signal.

A combination as described in the opening paragraph, for recording a digital audio signal, is presently available on the market. The recording arrangement is in the form of the DCC 900 digital compact cassette recorder and the source selection arrangement is in the form of the FA 930 amplifier, both of the Philips brand. The DCC 900 digital compact cassette recorder is capable of recording a digital audio signal on a magnetic type of record carrier.

The recording arrangement mentioned above is capable of recording an audio signal in digital form on the record carrier, and comprises a user actuatable input unit in the form of a knob that can be positioned in four positions: 'analog-in', 'digital-in', 'optical-in' and 'automatic'. The knob is a selector knob, with which the input of the recording unit in the recording arrangement can be switched to one of the analog, digital electrical or optical inputs of the arrangement. The fourth position 'automatic' places the arrangement in an automatic input selection mode, in which it is determined whether a signal is present on the optical input. If so, the first switching unit is set in a position in which the signal applied to the optical input is supplied to the recording unit. If not, it is determined whether a signal is present on the digital electrical input. If so, the first switching unit is set in a position in which the signal applied to the digital input is supplied to the recording unit. If not, the switching unit is set to the position in which the analog input is coupled to the recording unit. There is no subsequent switching to another position if later on a signal appears on the digital electrical or optical input.

Source selection takes place in the FA 930 amplifier and is realized by actuating a source selector button. Sources identified by 'CD', 'TUNER' and at least one auxiliary source 'AUXi' can be selected for recording. Selection thus requires two actuations for the user, one for selecting the input of the recording arrangement, and a second for selecting the source in the amplifier.

SUMMARY OF THE INVENTION

The present invention aims at providing measures to simplify the use of the combination by the user.

The combination in accordance with the invention is characterized in that the selection signal generator also comprises a memory having a control signal input coupled to the input unit. The memory is adapted to store information relating to the source selected by the user by means of the input unit and indicating to which input of the analog electrical input, the digital electrical and/or optical input of the recording arrangement the signal supplied by the selected source is applied. The memory also has a control signal output coupled to the first control signal input for supplying a switching control signal in response to the user actuating the input unit to the first switching unit. This results in the source selection as well as the selection of the kind of input of the recording arrangement to take place in response to the actuation of the input unit, so that a simplified control of the combination is obtained.

The memory unit, the actuatable input unit and the selection signal generator can be accommodated in either the recording arrangement or the source selection arrangement. Preferably, however the recording arrangement comprises the memory.

The combination may be further characterized in that it comprises a second user actuatable input for generating the information relating to the source selected by the user and indicating to which input of the analog electrical input, the digital electrical and/or optical input of the recording arrangement the signal supplied by the selected source is applied, and for storing that information in the memory. This offers the user the ability to change the contents of the memory to his own requirements. Again, it is noted that either the recording arrangement or the source selection arrangement can comprise the second user actuatable input unit.

The combination may be further characterized in that it further comprises a controllable signal amplifying unit for amplifying the signal applied to the analog electrical input, and a second memory for storing information relating to an amplification factor to be realized by the amplifying unit when selecting a source that supplies its signal to the analog electrical input. In that embodiment, an output of the second memory is coupled to a control signal input of the amplifying unit and the second memory has a control signal input coupled to the input unit. The second memory is adapted to retrieve the information relating to the amplification factor from a storage location in response to the user actuating the input unit so as to select a source that supplies its signal to the analog electrical input, and to supply the information to its output. This results in an automatic setting of the recording amplifier, which is preferably located in the recording arrangement, in response to simply selecting the source.

The combination may be further characterized in that it further comprises a third user actuatable input unit for generating the information relating to the amplification factor to be realized by the amplifying means when selecting a source that supplies its signal to the electrical analog input, and for storing that information in the second memory. This offers the user the ability to change the contents of the second memory, and thus the amplifier setting for the various analog sources selected.

BRIEF DESCRIPTION OF THE DRAWINGS

These and other aspects of the invention will be further elucidated with reference to the following figures, in which.

DESCRIPTION OF THE PREFERRED EMBODIMENTS

Figure 1:
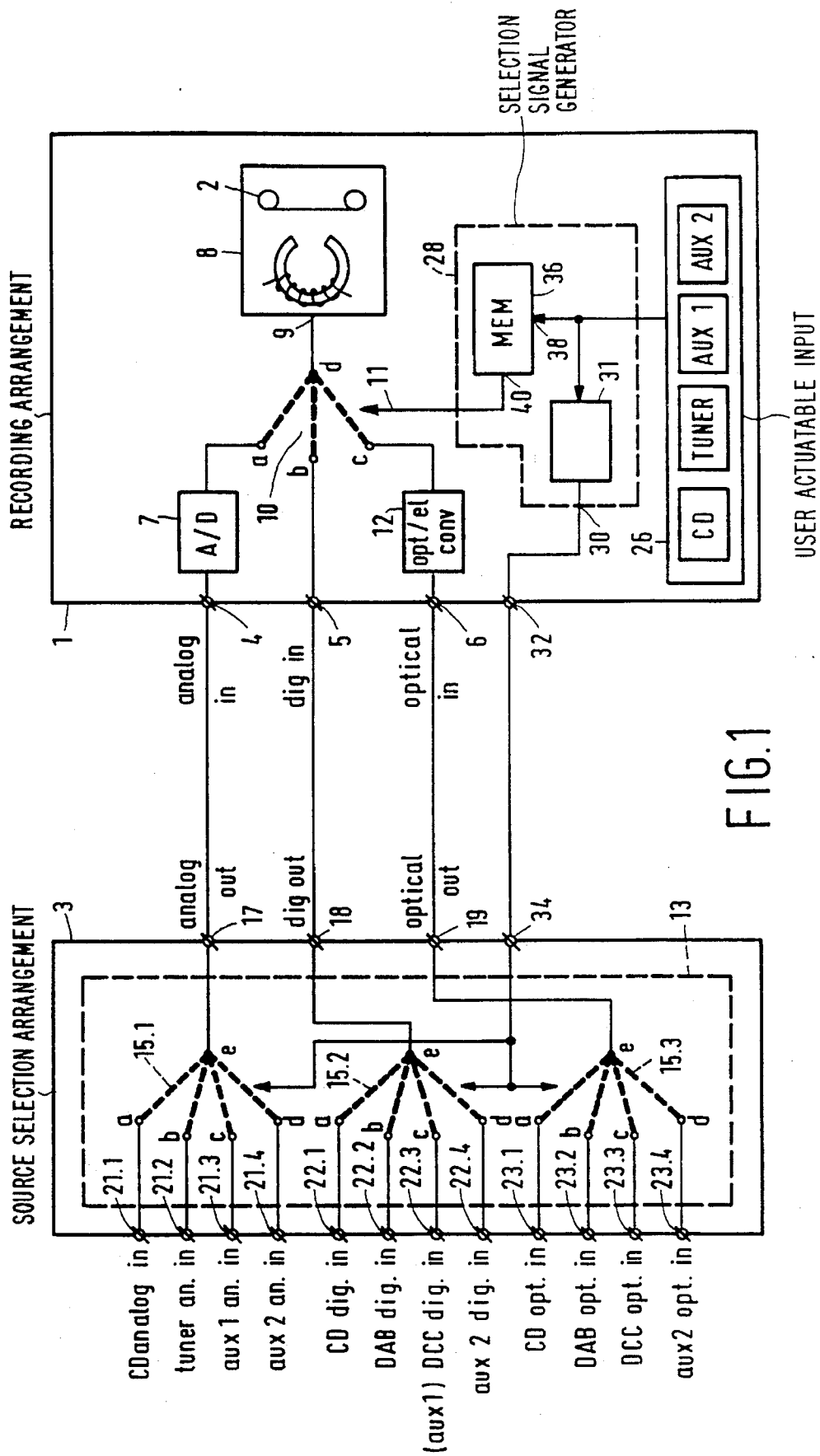
FIG. 1 shows a first embodiment of the combination.

FIG. 1 shows an embodiment of a combination of a recording arrangement 1 for recording an audio signal in a digital form on a magnetic record carrier 2 and a source selection arrangement 3. The recording arrangement 1 comprises an analog electrical input 4 for receiving an analog audio signal. The recording arrangement also comprises at least a second input. This at least second input can be a digital electrical input for receiving a digital audio signal, or an optical input for receiving an audio signal in optical form. In the embodiment of FIG. 1, the recording arrangement 1 comprises three inputs, the second and third inputs being a digital electrical input 5 and an optical input 6. Via the optical input, a digital audio signal can be applied to the recording arrangement.

The arrangement 1 further comprises an analog-to-digital converter 7 for converting the analog audio signal applied to the analog electrical input 4 into a digital audio signal, an opto-electric converter 12 for converting the optical signal applied to the input 6 into a digital electrical signal, and a recording unit 8 for recording the digital audio signal applied to an input 9 onto the record carrier 2. The arrangement 1 also has a first switching unit 10 for coupling the analog electrical input 4, the digital electrical input 5 or the optical input 6 to the input 9 of the recording unit 8, under the influence of a first control signal applied via the control signal line 11. Normally, a digital signal processing unit (not shown) is accommodated between the terminal d of the switch 10 and the input 9 of the recording unit 8, the processing unit being adapted to carry out a channel modulation on the digital signal applied to its input.

The arrangement 1 functions under the influence of a microcontroller (not shown) which supplies control signals for that purpose to the various units in the arrangement.

The source selection arrangement 3 can be incorporated in an amplifier arrangement and comprises a source selection unit 13 for selecting between a first audio signal source in the form of a compact disc digital audio player, a second audio signal source in the form of a tuner and at least one auxiliary audio signal source. The source selection arrangement 3 has an analog electrical output 17 for supplying an analog audio signal, and at least a second output. The at least second output can be a digital electrical output for supplying a digital audio signal, or an optical output for supplying an audio signal in optical form. In the embodiment of FIG. 1, the selection arrangement comprises a digital electrical output 18, as well as an optical output 19.

The source selection unit 13 comprises first, second and third controllable switches 15.1, 15.2 and 15.3 respectively. The switch 15.1 has five terminals a–e, the terminal e of which is the fixed terminal and is coupled to the analog electrical output 17 for supplying an analog audio signal. The switch 15.2 has five terminals a–e, the terminal e of which is the fixed terminal and is coupled to the digital electrical output 18. The switch 15.3 has five terminals a–e, the terminal e of which is the fixed terminal and is coupled to the optical output 19 for supplying an audio signal. The switches are thus capable of selecting between four input signals.

The a-terminal of the switch 15.1 is coupled to an input 21.1 of the source selection arrangement, to which input an analog output of a CD player can be coupled. The b-terminal of the switch 15.1 is coupled to an input 21.2, to which input an analog output of a tuner can be coupled. The c-terminal of the switch 15.1 is coupled to an input 21.3, which is a first auxiliary input 'aux1', to which input an analog output of a compact cassette player can be coupled. The d-terminal of the switch 15.1 is coupled to an input 21.4, which is a second auxiliary input 'aux2', to which input the output of another analog signal source, such a an disk record player, can be coupled.

The a-terminal of the switch 15.2 is coupled to an input 22.1 of the source selection arrangement, to which input a digital output of a CD player can be coupled. The b-terminal of the switch 15.2 is coupled to an input 22.2, to which input a digital output of a digital audio broadcast receiver (DAB) can be coupled. The c-terminal of the switch 15.2 is coupled to an input 22.3, which is a first digital auxiliary input 'aux1', to which input a digital output of a digital magnetic tape player, such as a DCC player can be coupled. The d-terminal of the switch 15.2 is coupled to an input 22.4, which is a second digital auxiliary input 'aux2', to which input the digital output of another digital signal source can be coupled.

The a-terminal of the switch 15.3 is coupled to an input 23.1 of the source selection arrangement, to which input an optical output of a CD player can be coupled. The b-terminal of the switch 15.3 is coupled to an input 23.2, to which input an optical output of a digital audio broadcast receiver (DAB) can be coupled. The c-terminal of the switch 15.3 is coupled to an input 23.3, which is a first optical auxiliary input 'aux1' to which input an optical output of a digital magnetic tape player, such as a DCC player can be coupled. The d-terminal of the switch 15.3 is coupled to an input 23.4, which is a second optical auxiliary input 'aux2', to which input the optical output of another signal source can be coupled.

The analog electrical output 17 of the source selection unit 3 is coupled to the analog electrical input 4 of the recording unit 1. The digital electrical output 18 of the source selection unit 3 is coupled to the digital electrical input 5 of the recording unit 1. The optical output 19 of the source selection unit 3 is coupled to the optical input 6 of the recording unit 1.

It should be noted that: in the case that the recording arrangement 1 in the combination has an analog input and a digital electrical input only, the corresponding selection arrangement 3 in the combination at least has an analog output and a digital electrical output; and in the case that the recording arrangement 1 in the combination has an analog input and an optical input only, the corresponding selection arrangement 3 in the combination at least has an analog output and an optical output.

The embodiment of the source selection arrangement 3 of FIG. 1 is a very elaborated one. More simple embodiments of the selection arrangement are of course equally possible. As an example: the selection arrangement could have only one optical input which is directly connected to the optical output 19, only one digital electrical input which is directly coupled to the digital output 18, and a number of analog inputs, such as the inputs 21.1 to 21.4 that are coupled via the switch 15.1 to the analog output 17.

The combination further comprises a user actuatable input unit 26. In the present embodiment, the input unit 26 is incorporated in the recording arrangement 1. The input unit 26 comprise, as an example, four push buttons, identified by 'CD', 'TUNER', 'AUX1' and 'AUX2'. Pressing a push button results in a selection of one of the sources. In the present embodiment: the compact disc player, when pressing the 'CD' button; the (analog or digital) tuner, when pressing the 'TUNER' button; the (analog or digital) first auxiliary source (e.g. the compact cassette player or the DCC player) when pressing the 'AUX1' button; and the second auxiliary source (e.g. the disc record player) when pressing the 'AUX2' button.

The input unit 26 has an output coupled to an input of a selection signal generator unit 28. The selection signal generator means 28 is adapted to generate a selection signal at an output 30 in response to the user actuation of the input unit 26, the selection signal having a relation to the source being selected by the user by means of actuating the input unit 26. The output 30 of the selection signal generator unit 28 is coupled to a control signal output 32 of the arrangement 1. This control signal output 32 is coupled to a control signal input 34 of the arrangement 3. The selection signal applied to the arrangement 3 via the control signal input 34 is supplied to the switches 15.1, 15.2 and 15.3 as a switching signal. In response to this switching signal, the switches are positioned such that: if the push button 'CD' of the input unit 26 is actuated, all switches switch to their a-e position; if the push button 'TUNER' is actuated, all switches switch to their b-e position; if the push button 'AUX1' is actuated, all switches switch to their c-e position; if the push button 'AUX2' is actuated, all switches switch over to their d-e position. The electrical connection between the terminals 32 and 34 of both arrangements 1 and 3 respectively can be in the form of the well known ESI bus. This ESI bus realizes the communication between the above mentioned DCC 900 digital compact cassette recorder and the FA 930 amplifier.

The selection signal generator unit 28 further comprise a memory 36 having a control signal input 38 coupled to the output of the input unit 26. The memory 36 is adapted to store information relating to the source selected by the user by means of the input unit 26 and indicating to which input of the analog electrical input 4, the digital electrical input 5 or the optical input 6 of the recording arrangement the signal supplied by the selected source is applied.

Suppose that a CD player (not shown) has an optical output which is coupled to the optical input 23.1 of the arrangement 3, that a tuner (not shown) has its output coupled to the input 21.2 of the arrangement 3, that a DCC player (not shown) has its digital electrical output coupled to the input 22.3 of the arrangement 3 and that a record player (not shown) has its output coupled to the input 21.4 of the arrangement 3.

Recording an audio signal supplied by a CD player may require a 'CD synchro' pushbutton on the recording arrangement, which realizes a synchronized recording of the CD on the record carrier 2.

Recording the audio information supplied by the CD player on the record carrier 2 means that the switch 15.3 is switched into its a-e position and the switch 10 into its c-d position. Recording the audio information supplied by the tuner on the record carrier 2 means that the switch 15.1 is switched into its b-e position and the switch 10 into its a-d position. Recording the audio information supplied by the DCC player on the record carrier 2 means that the switch 15.2 is switched into its c-e position and the switch 10 into its b-d position. Recording the audio information supplied by the record player on the record carrier 2 means that the switch 15.1 is switched into its d-e position and the switch 10 into its a-d position.

Figure 2:
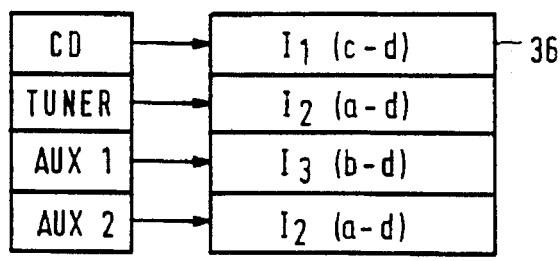
FIG. 2 shows the contents of the memory in the recording arrangement of FIG. 1.

The memory 36 contains a first information code $I_1$ in a first storage location that can be addressed by the signal generated by the input unit 26 upon pressing the 'CD' push button. When pressing the 'CD' push button, the first information code $I_1$ is outputted at the output 40 and supplied to the switch 10 as a switching control signal, under the influence of which the switch 10 switches to its c-d position. The memory 36 contains a second information code $I_2$ in a second storage location that can be addressed by the signal generated by the selection means 26 upon pressing the 'TUNER' push button. When pressing the 'TUNER' push button, the second information code $I_2$ is outputted at the output 40 and supplied to the switch 10 as a switching control signal, under the influence of which the switch 10 switches to its a-d position. The memory 36 contains a third information code $I_3$ in a third storage location that can be addressed by the signal generated by the selection means 26 upon pressing the 'AUX1' push button. When pressing the 'AUX1' push button, the third information code $I_3$ is outputted at the output 40 and supplied to the switch 10 as a switching control signal, under the influence of which the switch 10 switches to its b-d position. The memory 36 also contains the second information code $I_2$ in a fourth storage location that can be addressed by the signal generated by the input unit 26 upon pressing the 'AUX2' push button. When pressing the 'AUX2' push button, the second information code $I_2$ is outputted at the output 40 and supplied to the switch 10 as a switching control signal, under the influence of which the switch 10 switches to its a-d position. FIG. 2 shows the contents of the four memory locations in the memory 36 that can be addressed and outputted by depressing one of the various push buttons.

The embodiment of FIG. 1 shows the memory 36, the input unit 26 and the selection signal generator unit 28 being incorporated in the recording arrangement 1. It is also possible, however, to incorporate one or more of those elements in the source selection arrangement 3. For instance, in the case where all of the elements are incorporated in the source selection arrangement 3, there is the need for the signal connection between the terminals 32 and 34 so as to supply the output signal present at the output 40 of the memory 36 to the switch 10 in the recording arrangement 1.

In the embodiment of FIG. 1, the source selection arrangement 3 may be provided with a display which is controlled by the control signal appearing at the input 34, under the influence of which the display indicates which source, i.e., the CD player, the tuner or the first or second auxiliary source, has been selected.

It should further be noted that the combination may be provided with a remote control device (not shown) by means of which all of the control functions described above may be realized. It may even be possible that some control functions are only provided on the remote control, and not on the recording arrangement 1 or the selection arrangement 3.

Figure 3:
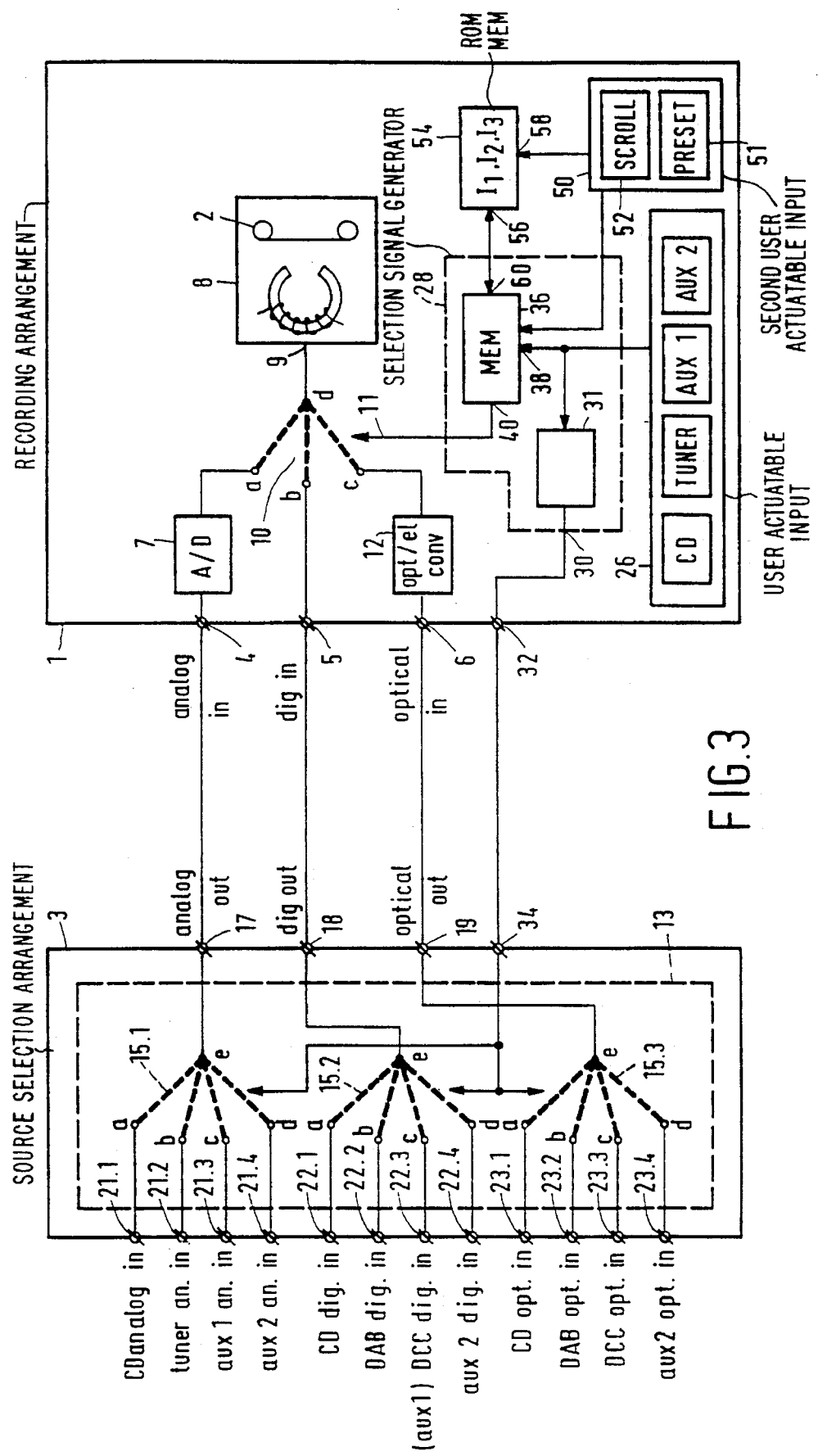
FIG. 3 shows a second embodiment of the combination.

FIG. 3 shows another embodiment of the combination. The combination of FIG. 3 largely resemblances the combination of FIG. 1. The recording arrangement 1' in FIG. 3 further comprises a second user actuatable input unit 50 for inputting the information ($I_1$, $I_2$, $I_3$) and for storing that information into the memory 36. The input unit 50 comprises a 'PRESET' key 51 and a SCROLL key 52. The arrangement 1' further comprises a ROM memory 54 in which the three information values $I_1$, $I_2$ and $I_3$ are stored. The memory 54 supplies the $I_1$ value at an output 56 in response to a control signal applied to an input 58 by means of the input means 50. The output 56 of the memory 54 is coupled to a information signal input 60 of the memory 36.

By first pressing the 'PRESET' key 51, the recording arrangement 1' is switched into a 'preset' mode, in which the first memory location of the memory 36 can be filled. The user must identify on which input (4, 5 or 6) of the recording arrangement 1' the output signal of the CD player is available if an audio signal supplied by the CD player should be recorded. The default value in the first memory location is $I_3$, in the sense that it is expected that the CD player supplies the audio signal in digital form to the arrangement 1'. Pressing the scroll key 52 once, results in the memory 54 supplying the $I_1$ value to its output 56 under the influence of the control signal generated by the input unit 50 and supplied to the control signal input 58. As in the situation of FIG. 1, the CD signal is applied to the recording arrangement 1' in optical form, the first memory location of the memory 36 is now correctly filled.

Upon a second pressing of the 'PRESET' key 51, the second memory location of the memory 36 can be filled. Assuming that the default value in the second memory location is again $I_3$, once pressing the scroll key 52 results in the memory 54 supplying the $I_1$ value, and pressing the scroll key 52 for the second time results in the memory 54 supplying the 12 value to its output 56, so that the $I_2$ value can be stored in the second memory location of the memory 36. As in the situation of FIG. 1, the tuner signal is applied to the recording arrangement 1' in analog form, the second memory location of the memory 36 is now correctly filled.

Upon pressing the 'PRESET' key 51 for the third time, the third memory location of the memory 36 can be filled. Assuming that the default value in the third memory location is again $I_3$. There is no need to change the contents of the third memory location, as the first auxiliary source (the DCC player) supplies the audio signal via the digital electrical input 5.

Upon pressing the 'PRESET' key 51 for the fourth time, the fourth memory location of the memory 36 can be filled. Assuming that the default value in the fourth memory location is again $I_3$, once pressing the scroll key 52 results in the memory 54 supplying the $I_1$ value, and pressing the scroll key 52 for the second time results in the memory 54 supplying the $I_2$ value to its output 56, so that the $I_2$ value can be stored in the fourth memory location of the memory 36. As, in the situation of FIG. 1, the second auxiliary source (the record player) supplies the audio signal to the recording arrangement 1' in analog form, the fourth memory location of the memory 36 is now correctly filled.

It should of course be noted that other ways of setting the contents of the memory 36 is equally possible. For instance, by selecting the source CD, starting the CD player into the play mode, and detecting in the arrangement 1 on which input a signal is available. After detecting an input signal on one of the inputs, the information $I_1$, $I_2$ or $I_3$, corresponding to that input is stored in the memory 36. This is repeated for the other sources.

Figure 4:
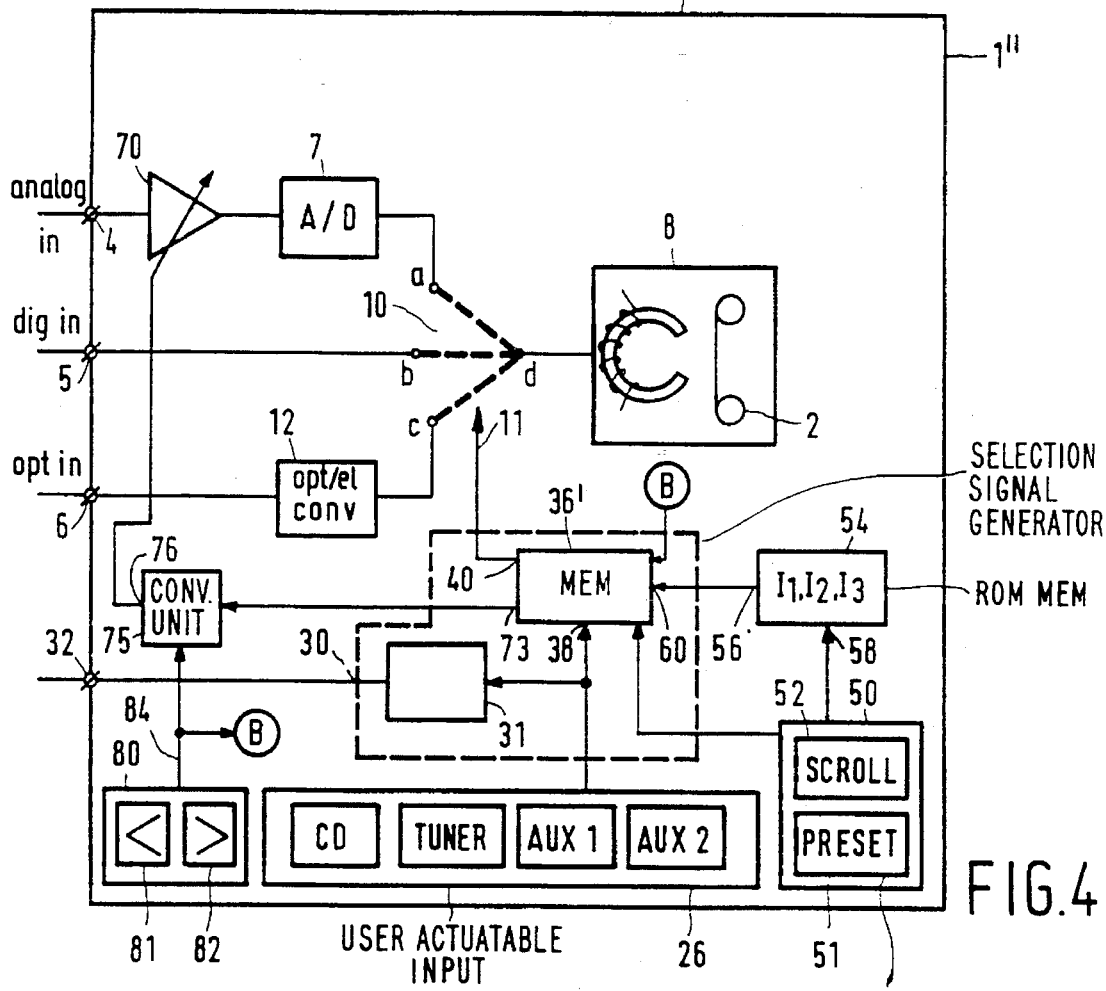
FIG. 4 shows another embodiment of the recording arrangement.
Figure 5:
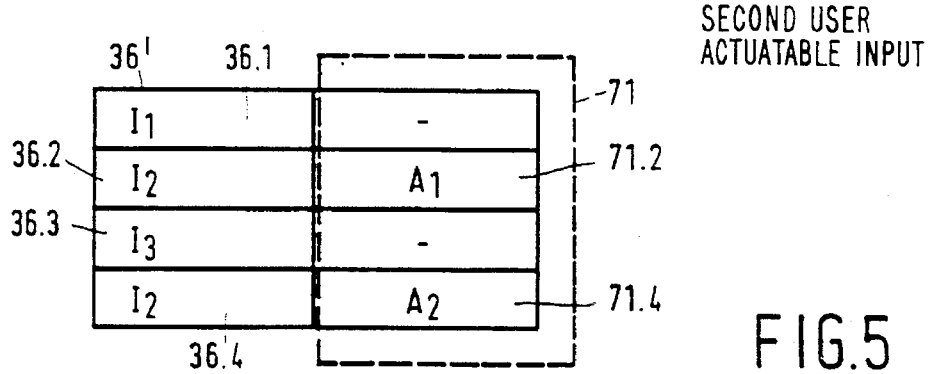
FIG. 5 shows the contents of the memory in the recording arrangement of FIG. 4.

FIG. 4 shows another embodiment of the recording arrangement i.e., recording arrangement 1". The recording arrangement 1" of FIG. 4 largely resemblances the recording arrangement 1' of FIG. 3. The recording arrangement 1" further comprises a controllable signal amplifier 70 coupled in the electrical connection between the input 4 and the input of the analog-to-digital converter 7. The memory 36' is different from the memory 36 of FIGS. 1 and 3, in the sense that the memory 36' has further storage locations, see FIG. 5, for storing information relating to an amplification factor that should be supplied to the amplifier 70. From FIG. 5 is will be clear that the memory 36' has a double amount of storage locations. The storage locations indicated by the broken line 71 indicates the extra storage capacity that memory 36' has in comparison with the memory 36 of FIGS. 1 or 3. This memory space 71 could, of course, have been incorporated in a separate second memory. In the embodiment of FIGS. 4 and 5 however, those memories are combined in the memory 36'.

As can be seen in FIG. 5, the second storage location in the part 71 of the memory 36' comprises information $A_1$ in relation to a first amplification factor to be realized by the amplifier 70. It is assumed that the information $A_1$ results in an amplification factor for the amplifier 70 to be equal to $A_1$. The fourth storage location in the part 71 of the memory 36' comprises information $A_2$ to be realized by the amplifier 70.

Upon actuating the push button 'TUNER' in the actuatable input unit 26, and thus under the influence of the address signal applied to the address input 38 of the memory 36', this memory supplies the information $I_2$ to its output 40, as explained with reference to FIG. 1. Further, this address signal allocates the second storage location in the memory part 71, so that the information $A_1$ is supplied to a second output 73 of the memory 36'. This information is supplied, if needed via a conversion unit 75 in which the information is converted into the required control signal, which control signal is supplied to the output 76, and thus supplied to the amplifier 70. The amplifier 70 is controlled in response to this control signal so as to realize an amplification of the tuner signal applied to the input 4 by a factor of $A_1$.

Upon actuating the push button 'AUX2' in the actuatable input unit 26, and thus under the influence of the address signal applied to the address input 38 of the memory 36', the memory 36' again supplies the information $I_2$ to its output 40, as explained with reference to FIG. 1. Further, this address signal allocates the fourth storage location in the memory part 71, so that the information $A_2$ is supplied to a second output 73 of the memory 36'. This information is supplied, if needed via the conversion unit 75 in which the information is converted into the required control signal, which control signal is supplied to the output 76, and thus supplied to the amplifier 70. The amplifier 70 is controlled in response to this control signal so as to realize an amplification of the record player signal applied to the input 4 by a factor of $A_2$.

The arrangement of FIG. 4 further comprises push buttons 81 and 82 in a third actuatable input unit 80 to be actuatable by the user. After having filled the first four memory locations 36.1 to 36.4 in the memory 36' with the information $I_1$, $I_2$, $I_3$ and $I_2$ respectively, in the way as described above with reference to FIG. 3, upon another pressing of the PRESET button 51, the arrangement is switched into a amplifier setting mode. In this mode, the push buttons 81 and 82 in the third input unit 80 can be actuated resulting in the generation of a control signal which is applied via the line 84 to the converter 75 (if present). Under the influence of pressing the push buttons 81 and 82, the amplification factor of the amplifier 70 can be decreased and increased respectively, until the required value (which is the value $A_1$, cf. FIG. 5) for the amplification factor has been established. The information available on the line 84 is also supplied to a second input 85 of the memory 36'. Upon pressing the preset button 51 again, this value $A_1$ is now stored in the second memory location 71.2 of the memory part 71.

Upon again another pressing of the present button 51, the procedure can be repeated so as to generate the value $A_2$ for storage in the fourth memory location 71.4.

Instead of providing the arrangement of FIG. 4 with an analog amplifier 70, it is equally possible to provide it with a controllable digital amplifier (not shown), which is coupled between the output of the analog-to-digital converter 7 and the a-terminal of the switch 10.

It should be noted here that the amplifier 70 need not necessarily be accommodated in the recording arrangement. It may be accommodated in the source selection arrangement.

The invention has been described with reference to embodiments which process audio signals. It should however be noted that the invention is not limited to this application, but that it is equally possible to apply the teachings of the present invention to a combination in which a video signal is selected by the selection arrangement and recorded by the recording arrangement.

We claim:

1. A combination of a recording arrangement for recording a signal in digital form on a record carrier and a source selection arrangement for selecting a source to supply a signal to the recording arrangement, the combination comprising:

the recording arrangement, which recording arrangement includes (a) an analog electrical input for receiving an analog signal, (b) a digital electrical input for receiving a digital signal and/or an optical input for receiving an optical signal, (c) an analog-to-digital converter for converting an analog signal applied to the analog electrical input into a digital signal, (d) recording means for recording a digital signal onto the record carrier, the recording means having an input for receiving the digital signal to be recorded, and (e) switching means for coupling the analog electrical input, the digital electrical input, if present, or the optical input, if present, to the input of the recording means under the influence of a switching control signal, the switching means having a control input for receiving the switching control signal;

the source selection arrangement, which source selection arrangement includes (a) an analog electrical output for supplying an analog signal, the analog electrical output being coupled to the analog electrical input, (b) a digital electrical output for supplying a digital signal and/or an optical output for supplying an optical signal, the digital electrical output, if present, being coupled to the digital electrical input, if present, and the optical output, if present, being coupled to the optical input, if present, and (c) source selection means for selecting between a first signal source, a second signal source and at least a third signal source under the influence of a selection control signal and thereby enabling the signal source selected to supply a signal to the analog electrical output, the digital electrical output, if present, or the optical output, if present, the source selection means having a control input for receiving the selection control signal;

user actuatable input means for allowing a user to select a source by means of actuating the input means; and selection signal generator means for generating the selection control signal at an output thereof in response to the user actuating the input means, the selection control signal having a relation to the source selected by the user and the output of the selection signal generator means being coupled to the control input of the source selection means, the selection signal generator means being coupled to the input means and including a memory (a) having (i) a control signal input coupled to the input means and (ii) a control signal output coupled to the switching means for supplying the switching control signal thereto and (b) storing information relating to the source selected by the user and indicating to which input of the analog electrical input, the digital electrical input, if present, or the optical input, if present, the signal supplied by the signal source selected is supplied.

2. The combination as claimed in claim 1, wherein the memory is included in the recording arrangement.

3. The combination as claimed in claim 2, wherein the input means is included in the recording arrangement.

4. The combination as claimed in claim 2, wherein the selection signal generator means is included in the recording arrangement.

5. The combination as claimed in claim 1, wherein the input means and the selection signal generator means are included in the source selection arrangement.

6. The combination as claimed in claim 1, further comprising second user actuatable input means for generating the information relating to the source selected by the user and indicating to which input of the analog electrical input, the digital electrical input, if present, or the optical input, if present, the signal supplied by the signal source selected is supplied, and for storing that information in the memory.

7. The combination as claimed in claim 6, wherein the second input means is included in the recording arrangement.

8. The combination as claimed in claim 6, wherein the second input means is included in the source selection arrangement.

9. The combination as claimed in claim 1, wherein when the optical input is present in the recording arrangement, the recording arrangement further includes an optical/digital converter for converting an optical signal applied to the optical input into a digital signal.

10. A combination of a recording arrangement for recording an audio signal in digital form on a record carrier and a source selection arrangement for selecting a source to supply an audio signal to the recording arrangement, the combination comprising:

the recording arrangement, which recording arrangement includes
(a) an analog electrical input for receiving an analog audio signal,
(b) a digital electrical input for receiving a digital audio signal and/or an optical input for receiving an optical audio signal,
(c) an analog-to-digital converter for converting an analog audio signal applied to the analog electrical input into a digital audio signal,
(d) recording means for recording a digital audio signal onto the record carrier, the recording means having an input for receiving the digital audio signal to be recorded, and
(e) switching means for coupling the analog electrical input, the digital electrical input, if present, or the optical input, if present, to the input of the recording means under the influence of a switching control signal, the switching means having a control input for receiving the switching control signal;

the source selection arrangement, which source selection arrangement includes
(a) an analog electrical output for supplying an analog audio signal, the analog electrical output being coupled to the analog electrical input,
(b) a digital electrical output for supplying a digital audio signal and/or an optical output for supplying an optical audio signal, the digital electrical output, if present, being coupled to the digital electrical input, if present, and the optical output, if present, being coupled to the optical input, if present, and
(c) source selection means for selecting between a first audio signal source which is in the form of a compact disc digital audio player, a second audio signal source which is in the form of a tuner and at least a third audio signal source under the influence of a selection control signal and thereby enabling the signal source selected to supply an audio signal to the analog electrical output, the digital electrical output, if present, or the optical output, if present, the source selection means having a control input for receiving the selection control signal;

user actuatable input means for allowing a user to select a source by means of actuating the input means; and selection signal generator means for generating the selection control signal at an output thereof in response to the user actuating the input means, the selection control signal having a relation to the source selected by the user and the output of the selection signal generator means being coupled to the control input of the source selection means, the selection signal generator means being coupled to the input means and including a memory (a) having (i) a control signal input coupled to the input means and (ii) a control signal output coupled to the switching means for supplying the switching control signal thereto and (b) storing information relating to the source selected by the user and indicating to which input of the analog electrical input, the digital electrical input, if present, or the optical input, if present, the audio signal supplied by the signal source selected is supplied.

11. The combination as claimed in claim 10, wherein the memory is included in the recording arrangement.

12. The combination as claimed in claim 11, wherein the input means is included in the recording arrangement.

13. The combination as claimed in claim 11, wherein the selection signal generator means is included in the recording arrangement.

14. The combination as claimed in claim 10, wherein the input means and the selection signal generator means are included in the source selection arrangement.

15. The combination as claimed in claim 10, further comprising second user actuatable input means for generating the information relating to the source selected by the user and indicating to which input of the analog electrical input, the digital electrical input, if present, or the optical input, if present, the signal supplied by the signal source selected is supplied, and for storing that information in the memory.

16. The combination as claimed in claim 15, wherein the second input means is included in the recording arrangement.

17. The combination as claimed in claim 16, wherein the second input means is included in the source selection arrangement.

18. The combination as claimed in claim 10, further comprising controllable signal amplifying means for amplifying an audio signal applied to the analog electrical input and a second memory for storing information relating to an amplification factor to be realized by the amplifying means when a signal source which supplies an audio signal to the analog electrical input is selected, the amplifying means having a control input, the second memory having an output coupled to the control input of the amplifying means and a control signal input coupled to the input means, the second memory being adapted to retrieve the information relating to the amplification factor from a storage location therein in response to the user actuating the input means so as to select a source that supplies an audio signal to the analog electrical input and supply that information to its output.

19. The combination as claimed in claim 18, further comprising additional actuatable input means for generating the information relating to the amplification factor to be realized by the amplifying means when a signal source which supplies an audio signal to the electrical analog input is selected, and for storing that information in the second memory.

20. The combination as claimed in claim 18, further comprising second user actuatable input means for generating the information relating to the source selected by the user and indicating to which input of the analog electrical input, the digital electrical input, if present, or the optical input, if present, the signal supplied by the signal source selected is supplied, and for storing that information in the memory.

21. The combination as claimed in claim 20, further comprising third actuatable input means for generating the information relating to the amplification factor to be realized by the amplifying means when a signal source which supplies an audio signal to the electrical analog input is selected, and for storing that information in the second memory.

22. A recording arrangement for recording a signal in digital form on a record carrier for use in a combination including the recording arrangement and a source selection arrangement for selecting a source to supply a signal to the recording arrangement, the recording arrangement comprising:

an analog electrical input for receiving an analog signal;

a digital electrical input for receiving a digital signal and/or an optical input for receiving an optical signal;

an analog-to-digital converter for converting an analog signal applied to the analog electrical input into a digital signal;

recording means for recording a digital signal onto the record carrier, the recording means having an input for receiving the digital signal to be recorded, switching means for coupling the analog electrical input, the digital electrical input, if present, or the optical input, if present, to the input of the recording means under the influence of a switching control signal, the switching means having a control input for receiving the switching control signal;

user actuatable input means for allowing a user to select a source by means of actuating the input means; and selection signal generator means for generating a selection control signal at an output thereof in response to the user actuating the input means, which selection control signal has a relation to the source selected by the user and causes a signal source to be selected and thereby supply a signal to the analog electrical input, the digital electrical input, if present, or the optical input, if present, the selection signal generator means being coupled to the input means and including a memory (a) having (i) a control signal input coupled to the input means and (ii) a control signal output coupled to the switching means for supplying the switching control signal thereto and (b) storing information relating to the source selected by the user and indicating to which input of the analog electrical input, the digital electrical input, if present, or the optical input, if present, the signal supplied by the signal source selected is supplied.

23. The recording arrangement as claimed in claim 22, further comprising second user actuatable input means for generating the information relating to the source selected by the user and indicating to which input of the analog electrical input, the digital electrical input, if present, or the optical input, if present, the signal supplied by the signal source selected is supplied, and for storing that information in the memory.

24. The recording arrangement as claimed in claim 22, further comprising controllable signal amplifying means for amplifying an audio signal applied to the analog electrical input and a second memory for storing information relating to an amplification factor to be realized by the amplifying means when a signal source which supplies an audio signal to the analog electrical input is selected, the amplifying means having a control input, the second memory having an output coupled to the control input of the amplifying means and a control signal input coupled to the input means, the second memory being adapted to retrieve the information relating to the amplification factor from a storage location therein in response to the user actuating the input means so as to select a source that supplies an audio signal to the analog electrical input and supply that information to its output.

25. A source selection arrangement for selecting a source to supply a signal to a recording arrangement which records a signal on a record carrier for use in a combination including the recording arrangement and the source selection arrangement, which recording arrangement includes (a) an analog electrical input for receiving an analog signal, (b) a digital electrical input for receiving a digital signal and/or an optical input for receiving an optical signal, (c) recording means for recording a signal onto the record carrier, the recording means having an input for receiving the signal to be recorded, and (d) switching means for coupling the analog electrical input, the digital electrical input, if present, or the optical input, if present, to the input of the recording means under the influence of a switching control signal, the source selection arrangement comprising:

an analog electrical output for supplying an analog signal to the analog electrical input;

a digital electrical output for supplying a digital signal to the digital electrical input, if present, and/or an optical output for supplying an optical signal to the optical input, if present;

source selection means for selecting between a first signal source, a second signal source and at least a third signal source under the influence of a selection control signal and thereby enabling the signal source selected to supply a signal to the analog electrical output, the digital electrical output, if present, or the optical output, if present, the source selection means having a control input for receiving the selection control signal;

user actuatable input means for allowing a user to select a source by means of actuating the input means; and selection signal generator means for generating the selection control signal at an output thereof in response to the user actuating the input means, the selection control signal having a relation to the source selected by the user and the output of the selection signal generator means being coupled to the control input of the source selection means, the selection signal generator means being coupled to the input means and including a memory (a) having (i) a control signal input coupled to the input means and (ii) a control signal output for supplying the switching control signal to the switching means and (b) storing information relating to the source selected by the user and indicating which output of the analog electrical output, the digital electrical output, if present, or the optical output, if present, the signal supplied by the signal source selected is supplied.

\* \* \* \* \*